Sept. 11, 1956  G. JENDRASSIK  2,762,557
PRESSURE EXCHANGERS

Filed June 5, 1950  5 Sheets-Sheet 2

INVENTOR
GEORGE JENDRASSIK
BY Stevens, Davis, Miller & Mosher
ATTORNEYS

Sept. 11, 1956   G. JENDRASSIK   2,762,557
PRESSURE EXCHANGERS
Filed June 5, 1950   5 Sheets-Sheet 3
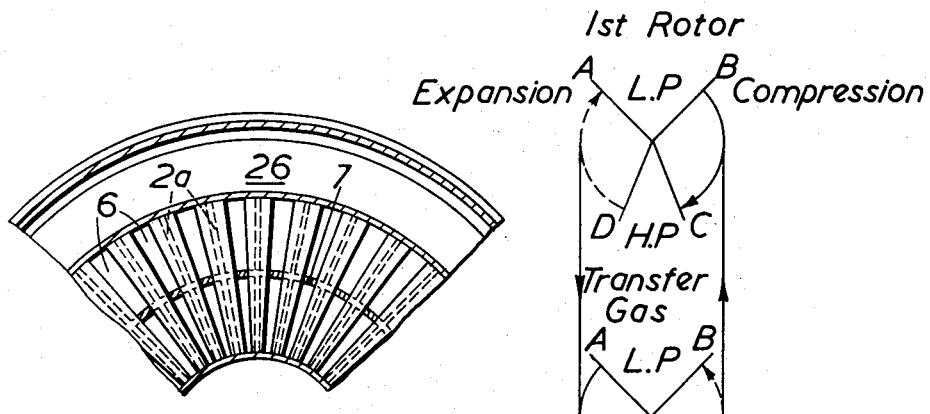
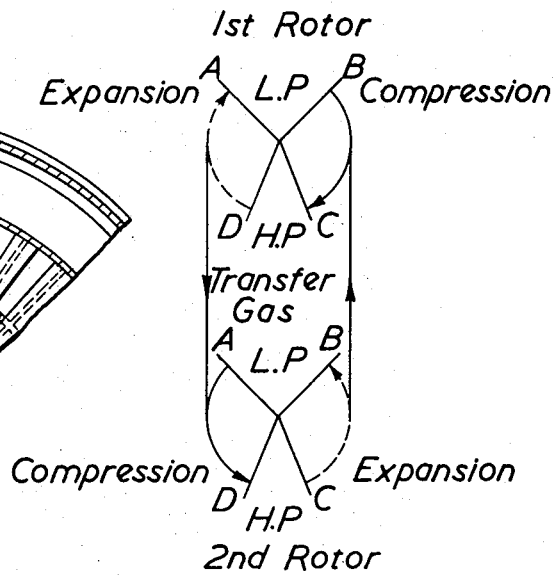
Fig. 3
Fig. 4
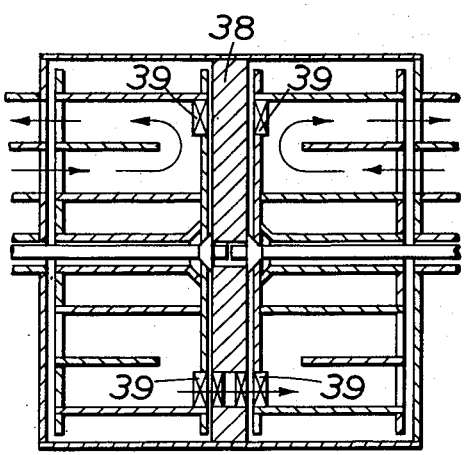
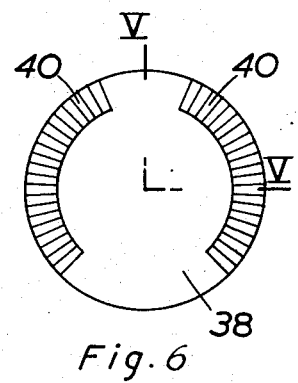
Fig. 5
Fig. 6
Inventor.
George Jendrassik
By Stevens, Davis, Miller & Mosher
his Attorneys Sept. 11, 1956  G. JENDRASSIK  2,762,557
PRESSURE EXCHANGERS
Filed June 5, 1950  5 Sheets-Sheet 4
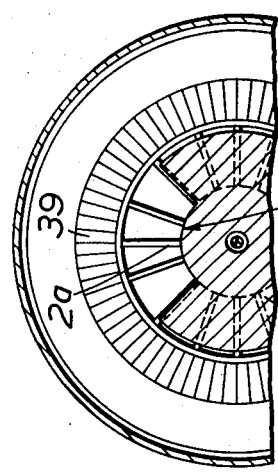
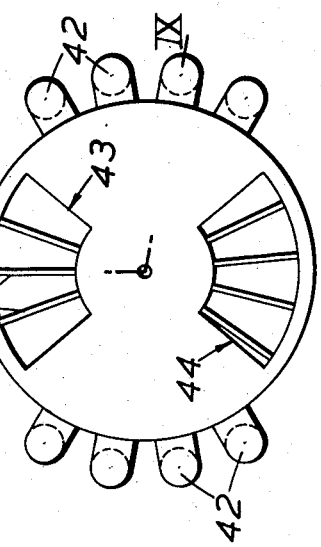
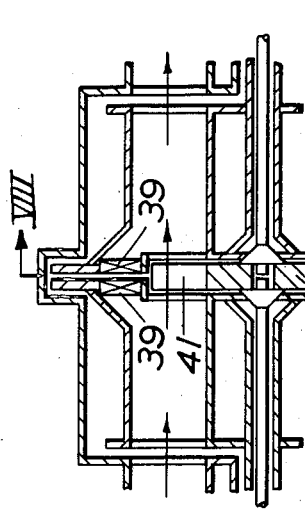
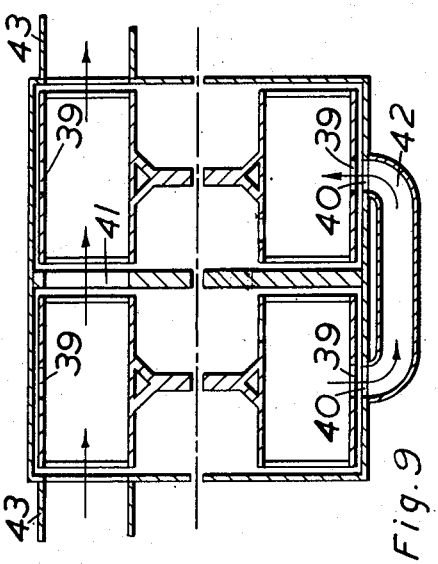

Sept. 11, 1956     G. JENDRASSIK     2,762,557
PRESSURE EXCHANGERS
Filed June 5, 1950                           5 Sheets-Sheet 5

Inventor
George Jendrassik
By Stevens, Davis, Miller & Mosher
his Attorneys

2,762,557

PRESSURE EXCHANGERS

George Jendrassik, London, England; Andre G. T. Boszormenyi and Clara Jendrassik, executors of George Jendrassik, deceased, assignors, by mesne assignments, to Jendrassik Developments Limited, London, England Application June 5, 1950, Serial No. 166,284

Claims priority, application Great Britain June 14, 1949

8 Claims. (Cl. 230—69)

This invention relates to pressure exchangers, by which term is to be understood rotary machines (being heat engines working with gaseous fluid) which comprise at least one rotor embodying cells arranged as a circular series, the working cycle of which machines involves the compression of gas in some cells of the series and the simultaneous expansion of gas in other cells of the series, the compression and expansion stages thus formed being associated with heat input and heat rejection stages (at high or low pressure) involving the flow of gas into, and/or out of, the cells.

The gas flow arising at a heat input stage need if possible be no more than the removal from the cells of surplus gas resulting from the increase in volume which arises from heating, and similarly, the gas flow arising at a heat rejection stage need if possible be no more than the addition of gas to the cells to make up for loss in volume resulting from cooling.

In practice it is a convenient expedient for at least the heat rejection (and possibly also the heat input) to occur externally of the cells, and to this end it has been proposed for the gas flow associated with the heat rejection and heat input stages to be effected by the process (hereinafter called "scavenging") by which each cell entering the heat input (or heat rejection) zone has its gas content removed and replaced by other gas which, externally of the cells, has been specially heated (or cooled), or which in either case if derived from a source of gas which is already at the desired high (or low) temperature, this process of removal and replacement involving a continuous current of gas flowing through the cells in which it is occurring.

The points in the working cycle at which heat input and heat rejection take place depends on the intended use of the machine. If the pressure exchanger is for use as a source of high pressure hot gas (e. g. for expansion in a gas turbine, or other engine, to provide mechanical work), then heat input occurs at high pressure and heat rejection at low pressure. On the other hand if the pressure exchanger be for use as a heat pump, or a refrigerating machine, then the converse is the case (i. e. heat input at low pressure, heat rejection at high pressure).

The pressure rise (or at least a part of it) occurring in the machine may be effected by expansion stage cells being placed into communication with compression stage cells, whereby the gas in the cells at higher pressure expands into the cells at lower pressure, thus compressing gas in the latter cells, with consequent flow of some gas from expanding cells to compression cells. Such a gas flow (or one functionally corresponding to it) will be hereinafter called "transfer gas" flow to distinguish it from the gas flow associated with the heat input and heat rejection stages.

The present invention aims at providing pressure exchangers operating in a novel manner which in general are capable of offering an improved performance compared with known proposals (e. g. by rendering possible the reduction of unavoidable losses), and which may have certain other advantages, such as constructional simplicity, higher specific output etc.

The present invention provides a pressure exchanger as above defined, comprising two rotors each embodying cells arranged as a circular series, and stator structure appropriately ported to permit the gas flow associated with heat input and heat rejection, being a machine of which the working cycle is such that, in operation, expansion cells of each rotor communicate with compression cells of the other rotor, so that, in each rotor, compression of gas is effected by the expansion of gas occurring in the other rotor, with consequent flow of transfer gas from each rotor to the other.

The invention includes arrangements having more than two rotors, of which any pair or pairs co-operate in operation as set forth in the preceding paragraph.

The rotors may be contra-rotating, and may be arranged in tandem (substantially co-axially), or otherwise. Alternatively, contra-rotating rotors, co-axially arranged, may be nested one within the other.

Scavenging (as above defined) is preferably employed at least at the heat rejection stage. Such scavenging may be in series or in parallel, with respect to the rotors.

In cases where substantially co-axial rotors in tandem are used, they may be separated by stationary structure, or they may be arranged closely adjacent with no such intervening stationary structure.

The stationary structure between the rotors, where present, may advantageously be provided with channels for the conveyance of transfer gas, and/or with port means to permit the flow of scavenging gas.

Such arrangements offer the advantage of permitting the use of larger orifices for the scavenging gas thus reducing the losses connected with scavenging, and of increasing the specific output as bigger volumes of gas can be put through the machine. The stationary channels for the transfer gas also permit the use of a better shape for the channels or the provision of guide vanes or blades in them, thus reducing the losses due to relative rotation. The stationary channels will always serve for gas flows in one direction only. Thus the shape may be adapted to the gas flow, whereas if there are no such stationary channels the available passages (since they are provided in the rotors) are required to serve for gas flow in both directions, as every cell is alternately under compression and expansion.

Further optional features according to the invention will appear below.

The invention may find useful application to pressure exchangers in which a part or all of the pressure rise and fall occurring in the machine is effected by waves of compression and expansion.

The so-called "exchange of pressure" between gas which is expanding and gas which is being compressed (e. g. between expansion cells which are in communication by "transfer gas" apertures with compression cells), which gives rise to the name of the machines under discussion, will, generally speaking, result at most in the equalisation of the pressure difference between the communicating zones. It may be possible however, by appropriate designing, to further continue the exchanging process beyond the equalisation point i. e. until the pressure of the gas which has been compressed has risen above that of the gas which has expanded.

Several examples of pressure exchangers according to the present invention will now be described with reference to the accompanying drawings. In so doing, it will be assumed for convenience that the machines described are intended for use to provide a supply of hot gas under pressure, for example, gas for expansion in a turbine to provide mechanical work. In the drawings:

Figure 1 is a section in the axial direction of one machine according to the invention, the section being taken along two different planes at right angles (as shown by the line I—I in Figure 2) so that the upper half of Figure 1 is a section through a part of the machine in which scavenging is taking place, while the lower half is a section through a part of the machine in which compression and expansion (with consequent flow of transfer gas) is taking place.

Figure 3 is a fragmentary view constituting a section on the line III—III in Figure 1.

Figure 4 is a cycle diagram of the operation of the machine shown in Figures 1 to 3, and other machines which are described below.

Figure 5 represents a modified machine and is an axial section taken along two planes at right angles to each other, on the lines V—V in Figure 6.

Figure 6 is a face view of the partition separating the two rotors.

Figure 7 represents a further modification and is a half section taken axially through a part of the machine where scavenging is taking place.

Figure 8 is a transverse section through Figure 7 approximately on the line VIII—VIII.

Figure 9 represents an alternative type of machine and is an axial section along planes at right angles as indicated by the line IX—IX in Figure 10.

Figure 10 is an end view of the machine shown in Figure 9.

Figure 13:
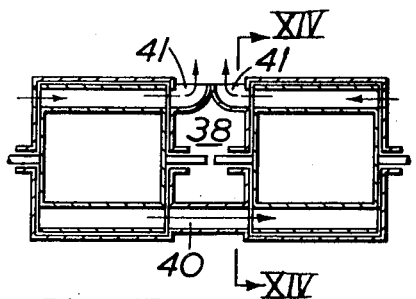
Figure 15:
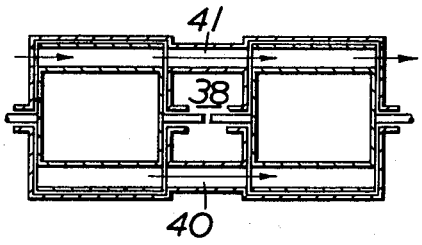
Figure 14:
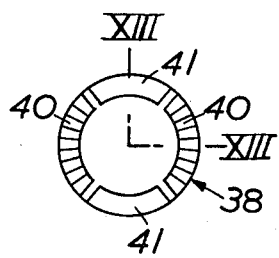
Figure 16:
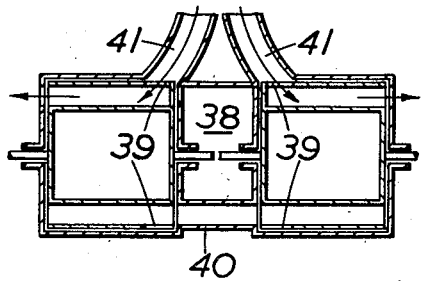

Figures 13–18 relate to further alternatives, Figures 13, 15, 16 and 17 being axial sections taken on two planes at right angles (thus Figure 13 is a section on the line XIII—XIII of Figure 14), and Figure 14 being a transverse section on the line XIV—XIV of Figure 13.

Figure 12:
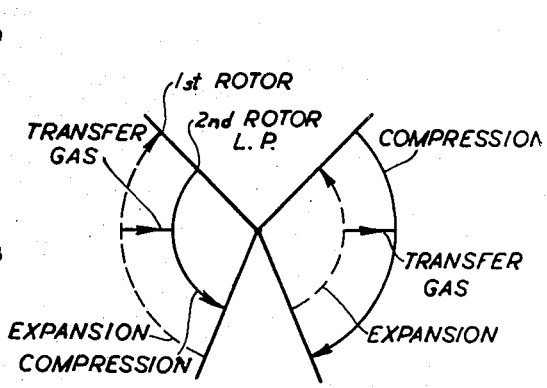
Figure 12 is a cycle diagram showing the operation of a machine according to Figure 11.
Figure 18:
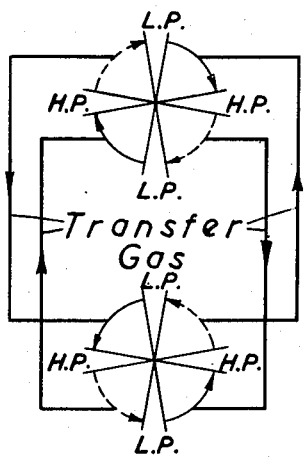

Figure 18 is a cycle diagram using similar notation to Figures 4 and 12.

Figure 1:
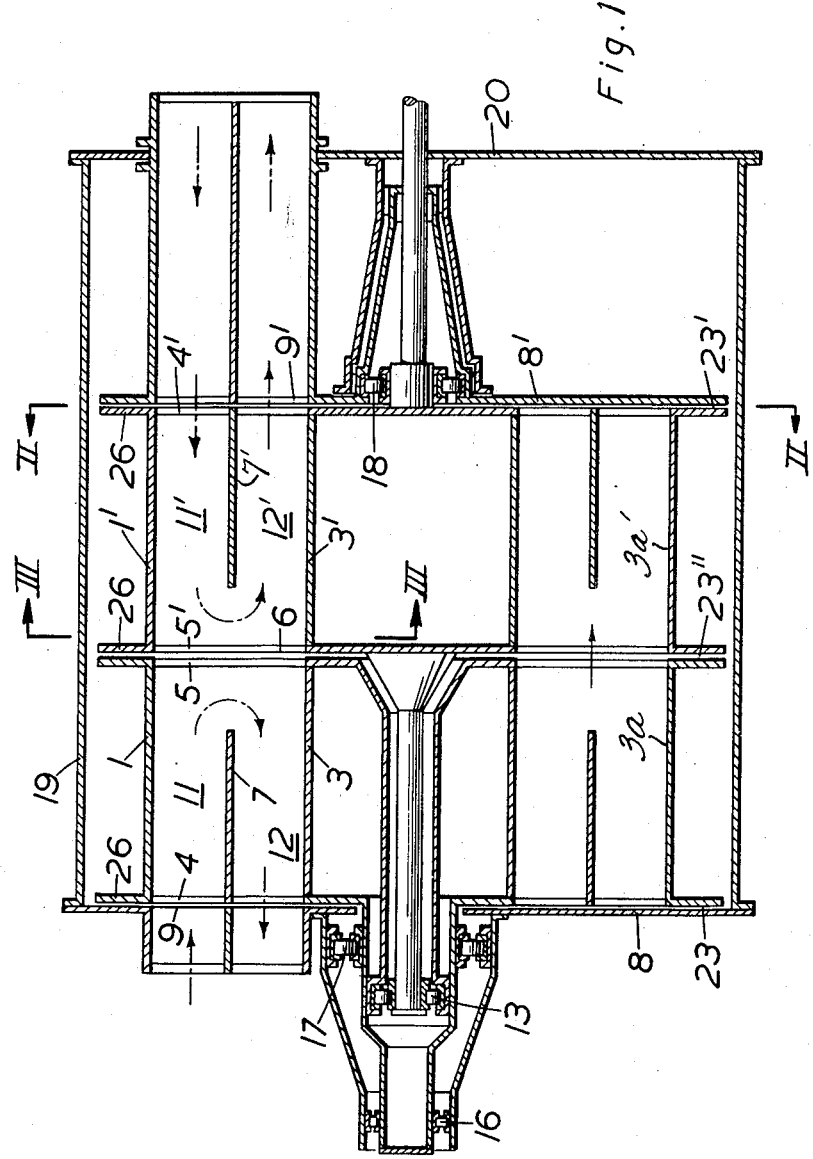
Figure 2:
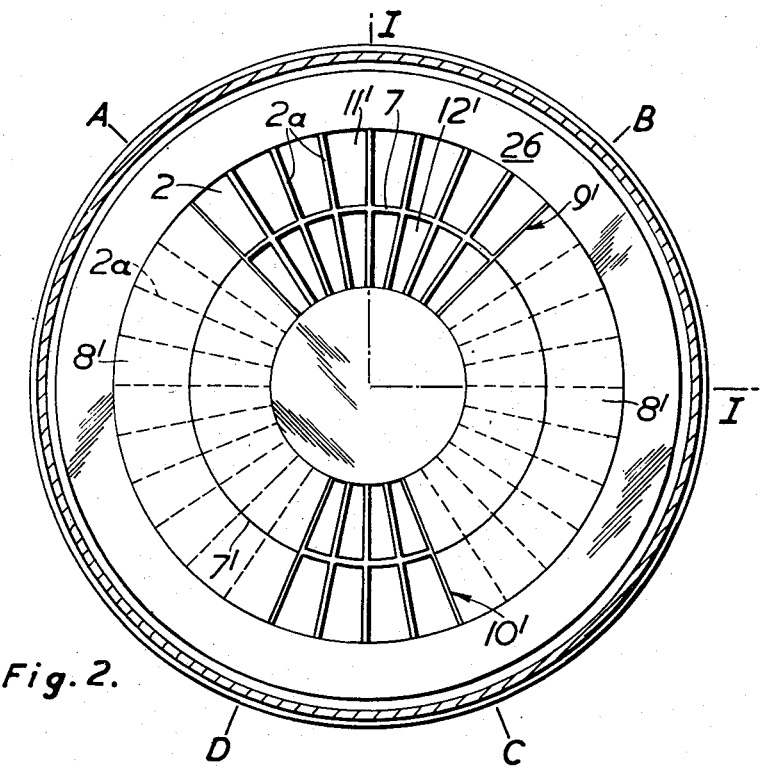
Figure 2 is a transverse section on the line II—II in Figure 1.

In Figures 1 to 3 the rotors 1, 1' are mounted in tandem as shown, and suitably driven to rotate in opposite directions. Each rotor 1, 1' comprises an inner cylinder 3, 3', and outer cylinder 3a, 3a', and intervening radial partitions 2a which form the circumferential series of cells 2. The cells are entirely open at their outside ends, 4a, 4', except that the openings may be a little reduced in size by narrow lands (not shown) serving as mountings for labyrinth seals in order to reduce leakage from one cell to others of the same rotor, and are partly open at their adjacent ends 5, 5', where the openings 6, which permit the transfer of gas from "expansion" cells of one rotor to "compression" cells in the other rotor, only extend over about ½ the circumferential width of each cell. This arrangement prevents any cell from communicating at the same time with more than one other cell except during the scavenging periods. The cells are divided by concentric cylindrical partition walls 7, 7' into two compartments, the cylindrical partition extending inwards from the outer ends of the cell rotors but stopping short of the inner ends, so that the radially inner and outer compartments in every cell are in free communication in the neighbourhood of the inner ends. The outer ends of the cell rotors are covered by stationary end plates 8, 8' which have ports 9, 9' for scavenging at low pressure, and similar ports such as 10' for scavenging at high pressure. The low pressure openings extend over an angle of about 90° (the arc A—B in Fig. 2) and the high pressure openings extend over an angle of about 45° (the arc C—D, Fig. 2). When the cells come in communication with the scavenging ports the open outer faces of the cells are fully exposed for scavenging. In the example shown, the rotors are scavenged in parallel. The ducts for the intake of fresh air to be compressed communicate with the radially outer compartments 11, 11' of the cells while the inside compartments 12, 12' communicate with the exhaust ducts for expanded gas on both outside faces of the cells, so that the scavenging air enters the outside compartment 11, 11', flow axially through the cells towards the axially interior faces thereof, thus clearing the cells of exhaust gas and refilling them with fresh air, in the course of which the scavenging gas undergoes reversal of flow and returns through the radially inner compartments 12, 12' of the cells. This way of scavenging permits full use of the cross section of the cells. If the scavenging took place through the inner openings 6 serious throttling would occur as the average open area may not be more than ¼ of the total circumferential cross section of a cell. The high pressure scavenging takes place in a similar manner, with the difference that the flow may be reversed as compared to the low pressure scavenging, i. e. the gas may enter the radially outer cell compartments first. Compressed gas for expansion coming, it is here assumed, from a combustion chamber, may enter the radially inner cell compartments, and the gas compressed in the machine emerges from the outer compartments, whence in the present case it is assumed to be wholly or partly led to the combustion chamber, from which some gas returns to the pressure exchanger while a surplus is used to perform work, e. g. in a turbine.

In operation the cells of the one rotor leaving the high pressure scavenging ducts come into communication through apertures 6 with the cells of the other rotor travelling in the opposite direction and coming from a region of lower pressure. The gas in the cells of the first rotor, in expanding, is partly discharged through the transfer gas apertures 6, thus effecting compression of the gas in the cells of the other rotor. Looking at Figure 2, in one rotor the cells on the arc B—C will be undergoing compression and will be individually at pressures increasing from B to C, while the cells on the arc D—A will be undergoing expansion and will be individually at pressures decreasing from D to A. In the other rotor, which is travelling in the opposite direction, the C to B cells will be simultaneously undergoing expansion while the A to D cells will be undergoing compression. The operation of the machine is diagrammatically shown in Figure 4, in which the direction of flow of the transfer gas from one rotor to the other is indicated by the arrowed straight lines. It will be noticed that there are no stationary transfer gas passages, the rotors being separated only by a small working clearance.

The cell rotors are supported as shown in bearings 13, 16, 17 and 18 so that the clearances 23, 23', 23" are small.

To prevent leakage losses, the end plates 8, 8' and the end faces of the rotors are outwardly extended in the radial direction as at 26 to provide for the accommodation of sealing means such as labyrinths or sealing blocks.

In order to keep down the leakage losses the machine may be enclosed in an outer housing 19, 20 in which an intermediate gas pressure is maintained.

In the machine according to Figures 5 and 6, the construction as will be obvious is in general very similar to that just described above, except that the rotors are separated by a fixed central partition 38 which is provided with stationary transfer gas channels 40 (see Figure 6). Clearance corresponding to 23, 23', 23" in Figure 1 require to be small. The apertures 39 are the cell apertures for the conveyance of transfer gas and correspond in function to the apertures 6 in Figures 1 to 3.

The alternative form of machine shown in Figure 7 is one in which "straight-through" axial scavenging as opposed to "reverse flow" scavenging is used. The rotors are again separated by a stationary partition 38 which has sector shaped ports such as 41 (Figure 8) to allow the passage of the scavenging gases. The transfer gas apertures 39 are located in a radially outward position in the adjacent ends of the two rotors as shown, so the apertures do not interfere with the scavenging flow. It will be seen that the rotors are scavenged in series.

Figures 9 and 10 show another form of machine in which straight through series scavenging is used. In this machine the rotors are again separated by a stationary partition 38 ported for scavenging flow in similar manner to the partition 38 in Figure 8. In the present case the apertures 39 for the transfer gas are provided around the outer peripheral wall of the cells, and in operation these apertures register with similar apertures 40 in the stationary casing, the apertures 40 being connected as shown by means of pipes 42 mounted externally of the casing. Alternatively it is possible to form the apertures 39 on the internal peripheral wall of the cells and to accommodate the pipes 42 internally of the casing.

Figure 11:
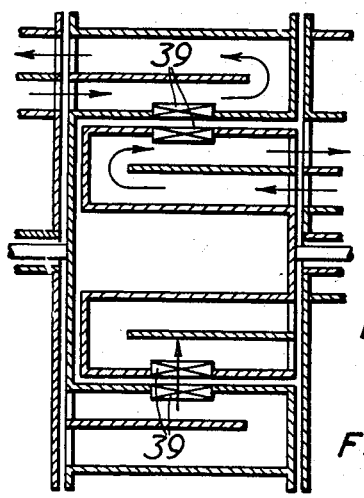
Figure 11 shows a machine in which the rotors are arranged concentrically one within the other.

Figure 11 shows a machine which functionally corresponds closely to that described with reference to Figures 1 and 2 but with the difference that the rotors are arranged concentrically one within the other, the general arrangement being obvious from the drawing. The apertures 39 for transfer gas are provided in the interior wall of the outer rotor and the exterior wall of the inner rotor. The figure is again an axial section along two planes at right angles, so that the upper half shows a scavenging zone, and the lower half shows a zone in which pressure exchange is taking place, with consequent flow of transfer gas.

Various other alternative kinds of machines using rotors in tandem are possible, using series or parallel scavenging, and in which the rotors are separated by stationary structure which may embody transfer gas channels and/or scavenging ports, or alternatively may have neither. When scavenging in parallel is employed, the direction of flow of the separate scavenging streams may be selected as convenient. Some of these further alternatives are shown in Figures 13–18, in which the reference notation is as follows:

38, stationary partition structure between the rotors.
39, special scavenging ports in outer cell periphery.
39a, special ports in outer cell periphery, used alternately for transfer flow and scavenging flow.
40, transfer gas apertures in stationary structure.
41, scavenging ports in stationary structure.
42, stationary pipes for transfer gas.

Figure 17:
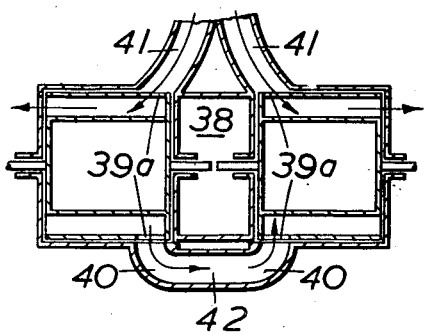

In Figures 13–16, both ends of the cells are also left open for the alternate passage of transfer flow and scavenging flow. In Figure 17, the inner ends of the cells may be closed, as shown, while the outer ends are open. The arrows in the upper half of the axial sections indicate the scavenging flow, those in the lower half indicate the transfer flow.

Some of the types of machine described above may be advantageously designed to work with each stage duplicated (i. e. for each rotor, two heat input stages, two heat rejection stages, two expansion stages and two compression stages). The working of such a machine is illustrated by Figure 18. The ducting etc. would naturally require to be duplicated accordingly.

What I claim is:

1. A pressure exchanger, in which gas compression results directly from and proceeds simultaneously with gas expansion, comprising two contra-rotatable rotors mounted on the same axis, cells around the periphery of each of said rotors, stationary structure adjacent said rotors, means providing a path through said stationary structure and cells of both rotors in series for scavenging gas flow at least once per working cycle of each cell, and means permitting transfer gas flow between cells of both rotors, when scavenging gas flow is not occurring in those cells, which transfer gas flow directly effects gas compression in cells of one rotor by gas expansion from cells of the other rotor.

2. A pressure exchanger as claimed in claim 1 in which the scavenging gas flow and the said transfer gas flow between the rotors are constrained to follow separate and distinct paths respectively.

3. A pressure exchanger as claimed in claim 2 in which paths for the said transfer gas flow are defined by apertures located in adjacent ends of the rotor and positioned radially aside from the flow path for the scavenging gases, the working clearance between the two rotors being of such smallness that, in operation, and having regard to the alignment of the said apertures, the said transfer gas flow occurs satisfactorily from one rotor to the other.

4. A pressure exchanger as claimed in claim 2 in which paths for the said transfer gas flow are defined by means comprising apertures provided in the peripheral walls of each rotor and stationary ducting so positioned that at intervals during the rotation of the rotors, the apertures are aligned with the ducting thereby forming the said paths.

5. A pressure exchanger, in which gas compression results directly from and proceeds simultaneously with gas expansion, comprising two contra-rotatable rotors mounted on the same axis, cells around the periphery of each of the said rotors, stationary structure which is adjacent the said rotors and which is ported to define a path therethrough and through the cells of both rotors in series for scavenging gas flow at least once per working cycle of each cell, and means permitting transfer gas flow between cells of both rotors, when scavenging gas flow is not occurring in those cells, which transfer gas flow directly effects gas compression in cells of one rotor by gas expansion from cells of the other rotor.

6. A pressure exchanger as claimed in claim 5 in which the rotors are mounted in tandem and are arranged to rotate at the same angular velocity.

7. A pressure exchanger as claimed in claim 6 in which the said stationary structure comprises a part separating the rotors from one another and which is ported to provide passages for the said scavenging gas flow.

8. A pressure exchanger, in which gas compression results directly from and proceeds simultaneously with gas expansion, comprising a stationary generally cylindrical structure with a part thereof extending across the interior and partitioning the said structure into two substantially equal cylindrical spaces, two contra-rotatable rotors both mounted on the longitudinal axis of the structure and each fitting closely within one of the said spaces, cells around the periphery of each rotor, ports in the end faces of the said stationary structure, corresponding passages through the said partition, together defining paths for scavenging gas flow through the said structure and the rotors in series, at least once per working cycle of each cell, and channels between cells of the two rotors, by which channels transfer gas flows between cells of both rotors, when scavenging gas flow is not occurring in those cells, which transfer gas flow directly effects gas compression in cells of one rotor by gas expansion from cells of the other rotor.

References Cited in the file of this patent

UNITED STATES PATENTS

| | | |
|---|---|---|
| 2,339,394 | Seippel | Apr. 30, 1946 |
| 2,526,618 | Darrieus | Oct. 24, 1950 |

FOREIGN PATENTS

| | | |
|---|---|---|
| 8,273 | Great Britain | 1906 |
| 290,669 | Great Britain | 1927 |
| 634,731 | France | Nov. 30, 1927 |